United States Patent
Brekke

(10) Patent No.: US 12,117,032 B2
(45) Date of Patent: Oct. 15, 2024

(54) EXPANDABLE WASHER

(71) Applicant: Columbia Insurance Company, Omaha, NE (US)

(72) Inventor: Steven Brekke, Lakeville, MN (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 349 days.

(21) Appl. No.: 17/225,669

(22) Filed: Apr. 8, 2021

(65) Prior Publication Data
US 2021/0324897 A1 Oct. 21, 2021

Related U.S. Application Data

(60) Provisional application No. 63/011,544, filed on Apr. 17, 2020.

(51) Int. Cl.
*F16B 31/04* (2006.01)
*F16B 39/24* (2006.01)
*F16B 43/00* (2006.01)

(52) U.S. Cl.
CPC .............. *F16B 31/04* (2013.01); *F16B 39/24* (2013.01); *F16B 43/009* (2013.01)

(58) Field of Classification Search
CPC ........ F16B 31/04; F16B 39/24; F16B 43/009; F16B 5/0283; F16B 43/00; E04B 2001/2688

(Continued)

(56) References Cited

U.S. PATENT DOCUMENTS 487,721 A * 12/1892 De Kalb ................. F16B 31/04
411/533
1,966,780 A * 7/1934 Wynrick ............. F16H 25/2006
411/536

(Continued)

FOREIGN PATENT DOCUMENTS

DE 102005007754 B3 * 5/2006 ............ F16B 43/009
EP 1310685 A1 5/2003

(Continued)

OTHER PUBLICATIONS

Tsukui, WO0175316A1—Locking washer device, 2001, WIPO Machine Translation (Year: 2001).*

(Continued)

*Primary Examiner* — Kristina R Fulton
*Assistant Examiner* — Jock Wong
(74) *Attorney, Agent, or Firm* — Stinson LLP

(57) ABSTRACT

An expandable washer for use with a fastener to maintain tension in the fastener after connection to a component comprises first and second disks. The first and second disks cooperatively define a channel having a dimension parallel to the expansion axis which decreases from a location remote from to a location closer to the expansion axis. The first and second disks are configured to pass the fastener through them and to the component. The fastener operatively engages the first disk for moving with the first disk and to place the fastener in tension when the fastener is connected to the component. The expandable washer further includes a cam located radially outward from the expansion axis and biased for movement toward the expansion axis to drive the first and second disks apart to maintain the application of force against the fastener.

35 Claims, 16 Drawing Sheets

(58) Field of Classification Search
USPC .......................................... 411/12, 535, 536
See application file for complete search history.

(56) References Cited

U.S. PATENT DOCUMENTS

| | | | | |
|---|---|---|---|---|
| 1,981,846 | A * | 11/1934 | Clark | ................ F16C 33/74 |
| | | | | 411/536 |
| 2,004,263 | A * | 6/1935 | Wyrick | ............ F16C 19/542 |
| | | | | 411/536 |
| 3,398,978 | A * | 8/1968 | Gasche | ................ F16L 23/24 |
| | | | | 285/368 |
| 3,490,796 | A * | 1/1970 | Smith, Jr. | ............. F16B 43/00 |
| | | | | 411/548 |
| 5,081,811 | A | 1/1992 | Sasaki | |
| 5,180,268 | A | 1/1993 | Richardson | |
| 5,364,214 | A | 11/1994 | Fazekas | |
| 5,522,688 | A | 6/1996 | Reh | |
| 5,535,561 | A | 7/1996 | Schuyler | |
| 5,709,516 | A | 1/1998 | Peterson et al. | |
| 5,987,828 | A | 11/1999 | Hardy | |
| 6,149,364 | A | 11/2000 | Maeda | |
| 6,195,949 | B1 | 3/2001 | Schuyler | |
| 6,390,747 | B1 | 5/2002 | Commins | |
| 6,880,433 | B1 * | 4/2005 | Tanimura | ............. F16B 39/02 |
| | | | | 411/119 |
| 7,037,060 | B2 | 5/2006 | Commins | |
| 7,168,902 | B2 | 1/2007 | Terry | |
| 7,316,533 | B2 | 1/2008 | Tanimura | |
| 7,509,778 | B2 | 3/2009 | Leek | |
| 7,621,085 | B2 | 11/2009 | Commins | |
| 7,905,066 | B2 | 3/2011 | Pryor et al. | |
| 8,136,318 | B2 | 3/2012 | Espinosa | |
| 8,186,924 | B1 | 5/2012 | Espinosa | |
| 8,276,323 | B2 | 10/2012 | Gray et al. | |
| 8,328,491 | B2 | 12/2012 | Bucknell et al. | |
| 8,517,655 | B2 | 8/2013 | Wang | |
| 8,656,650 | B2 | 2/2014 | Gray et al. | |
| 8,844,244 | B2 | 9/2014 | Gray | |
| 9,938,714 | B2 | 4/2018 | Dicaire | |
| 2006/0110238 | A1 | 5/2006 | Tsukui | |
| 2007/0286702 | A1 | 12/2007 | Smith | |
| 2010/0132178 | A1 | 6/2010 | Chiu | |
| 2010/0135748 | A1 * | 6/2010 | Bucknell | ............. F16B 31/04 |
| | | | | 411/535 |
| 2017/0275874 | A1 * | 9/2017 | Dicaire | ............. E04B 1/2604 |

FOREIGN PATENT DOCUMENTS

| | | | | |
|---|---|---|---|---|
| GB | 2246183 | A * | 1/1992 | ............. F16B 43/00 |
| JP | 5247713 | B2 | 7/2013 | |
| WO | WO-0175316 | A1 * | 10/2001 | ............. F16B 39/24 |

OTHER PUBLICATIONS

Tsukui, WO0175316A1—Locking washer device, 2001, Espacenet Machine Translation (Year: 2001).*
Merriam-Webster. (n.d.). Coil spring. In Merriam-Webster.com dictionary. Retrieved Nov. 16, 2023, from https://www.merriam-webster.com/dictionary/coil%20spring (Year: 2023).*
Merriam-Webster. (n.d.). Helical. In Merriam-Webster.com dictionary. Retrieved Nov. 16, 2023, from https://www.merriam-webster.com/dictionary/helical (Year: 2023).*
International Search Report and Written Opinion received for PCT Application Serial No. PCT/US2021/026403 dated Jul. 16, 2021, 12 pages.

* cited by examiner

EXPANDABLE WASHER

CROSS-REFERENCE TO RELATED APPLICATION

The present application claims priority to U.S. Provisional Patent Application No. 63/011,544, filed on Apr. 17, 2020, which is hereby incorporated by reference in its entirety.

FIELD

The present disclosure generally relates to expandable washers used to maintain a tight connection over time.

BACKGROUND

Take-up washers have a number of uses in making connections which may over time shift or move in such a way as to change the tightness of the connection but for the ability of the washer to take up slack. Conventional washers are used to distribute the compressive force applied by a head of a fastener against a component over a surface area larger than the head itself. Conventional washers are used by builders, handymen, and other people in various situations, but they cannot adjust should the connection become loose over time. One example in which a take-up washer has application is in the connection of an upper wood frame wall in a building with a lower wood frame wall separated by floor framing. Conventionally, straps are used to connect the walls together on the outside of a building. In some instances, the wood may shrink, or the walls may shift slightly over time. This can cause the straps to buckle, which may in some instances undesirably cause a bulge in an exterior siding or the like. If a long floor screw is used instead of a strap, the problem of strap buckling is resolved, but the tightness of the connection between the floors can be compromised. More specifically, the upper and lower wood frame walls connected by the screw may shift or move over time, resulting in the head of the screw moving away from a component of one of the wall frames. For example, in a wood frame building, the bottom plate of an upper wall and the top plate of a lower wall connected together by the screw may shift relative to one another over time, resulting in the head of a screw securing the two plates together moving away from or out of engagement with the plates. As a result, the head of the screw no longer applies a compressive force against the bottom plate or resists uplift forces.

SUMMARY

In one aspect of the present invention, an expandable washer for use with a fastener for connecting to a component to maintain tension in the fastener after connection to the component generally comprises a first expander member and a second expander member. The second expander member is operatively connected to the first expander member for relative movement with respect to each other along an expansion axis parallel to or coincident with a fastener insertion axis. The first and second expander members are in generally opposed relation and cooperatively define a channel having a dimension parallel to the expansion axis which decreases from a location remote from the expansion axis to a location closer to the expansion axis. The first and second expander members are configured to pass the fastener through the first and second expander members to the component so that the fastener operatively engages the first expander member for moving with the first expander member and the first expander member applies force to the fastener to place the fastener in tension when the fastener is connected to the component. A cam located radially outward from the expansion axis is biased for movement toward the expansion axis and between the first and second expander members to drive the first and second expander members apart to maintain the application of force to place the fastener in tension by the first expander member to the fastener when the fastener is received through the expandable washer and connected to the component. The expandable washer may also include anti-rotation elements associated with the first and second expander members are configured to prevent relative rotation of the first and second expander members.

In another aspect, an expandable washer for use with a fastener for connecting to a component to maintain tension in the fastener after connection to the component generally comprises a first expander member and a second expander member. The first and second expander members are operatively connected for movement relative to each other along an expansion axis parallel to or coincident with a fastener insertion axis. The first and second expander members cooperatively define a channel. The channel has a dimension parallel to the expansion axis which decreases from a location remote from the expansion axis to a location closer to the expansion axis. The fastener is configured to pass through the first and second expander members to the component. The fastener can operatively engage the first expander member for moving with the first expander member and the first expander member applies force to the fastener to place the fastener in tension when the fastener is connected to the component. A coil spring is located radially outward from the expansion axis. The coil spring is biased for movement toward the expansion axis in the channel between the first and second expander members. This movement drives the first and second expander members apart to maintain the application of force to maintain the fastener in tension with the first expander member. The coil spring is configured to transfer force between the first expander member and the second expander member in a direction perpendicular to the lengthwise extent of the coil spring as the spring force of the coil spring urges the coil spring to reduce the diameter of the coil spring.

In still another aspect of the present invention, an expandable washer for use with a fastener to connect to a component in order to maintain tension in the fastener generally comprises a first expander member and a second expander member. The first and second expander members are operatively connected for movement relative to each other along an expansion axis. The expansion axis is parallel to or coincident with a fastener insertion axis. The first and second expander members cooperatively define a channel. The channel has a dimension parallel to the expansion axis which decreases from a location remote from the expansion axis to a location closer to the expansion axis. The fastener passes through the first and second expander members to the reach the component. The fastener can operatively engage the first expander member for moving with the first expander member and the first expander member applies force to the fastener to place the fastener in tension when the fastener is connected to the component. A cam is located radially outward from the expansion axis and biased for movement toward the expansion axis and between the first and second expander members. This movement drives the first and second expander members apart to maintain the application of force necessary to keep the fastener in tension with the first expander member while the fastener is connected to the component. A housing receives and contains the first expander member, the second expander member and the cam.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 4:
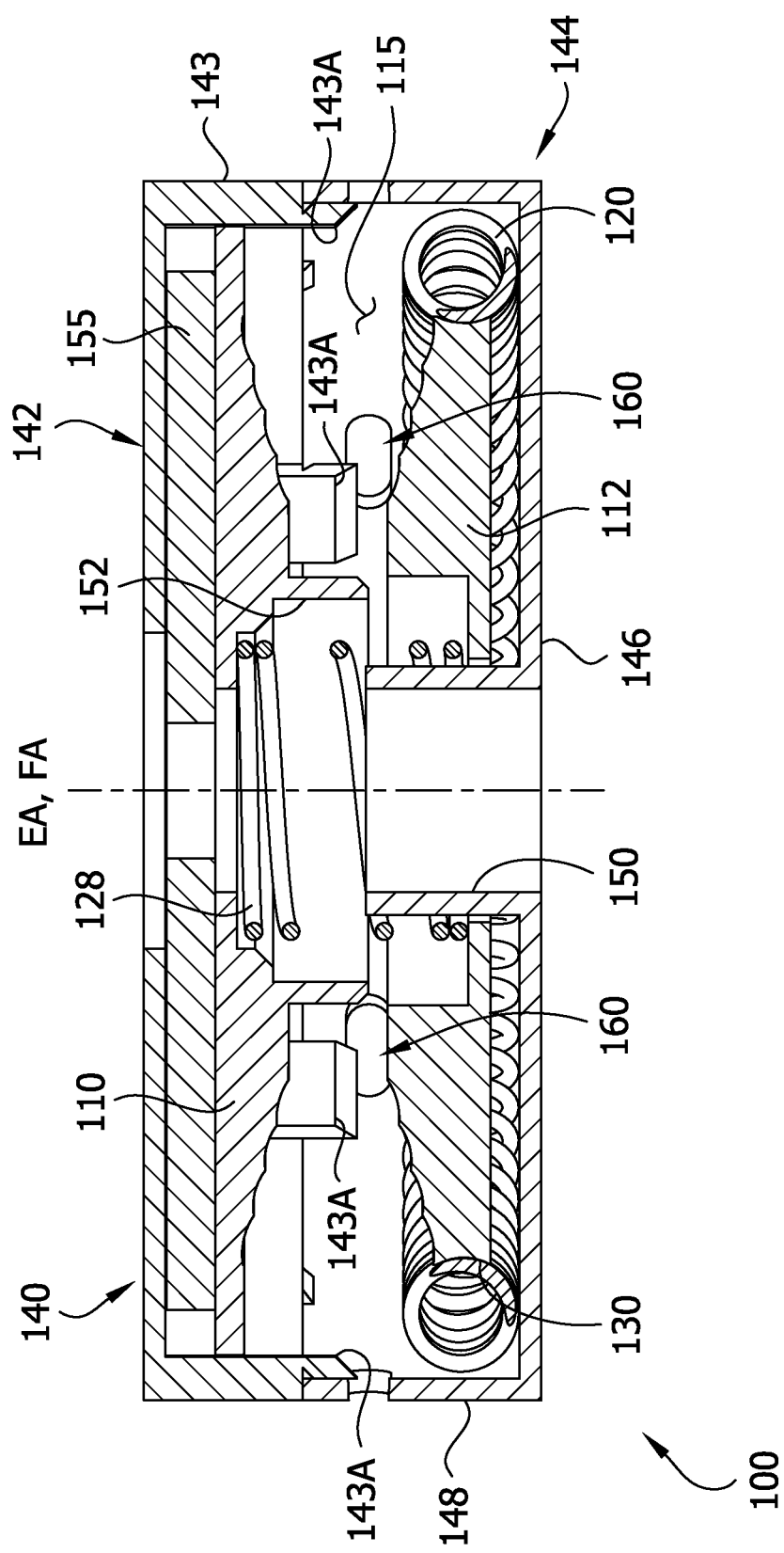
FIG. 4 is a vertical section of the expandable washer in an unactivated state.
Figure 5:
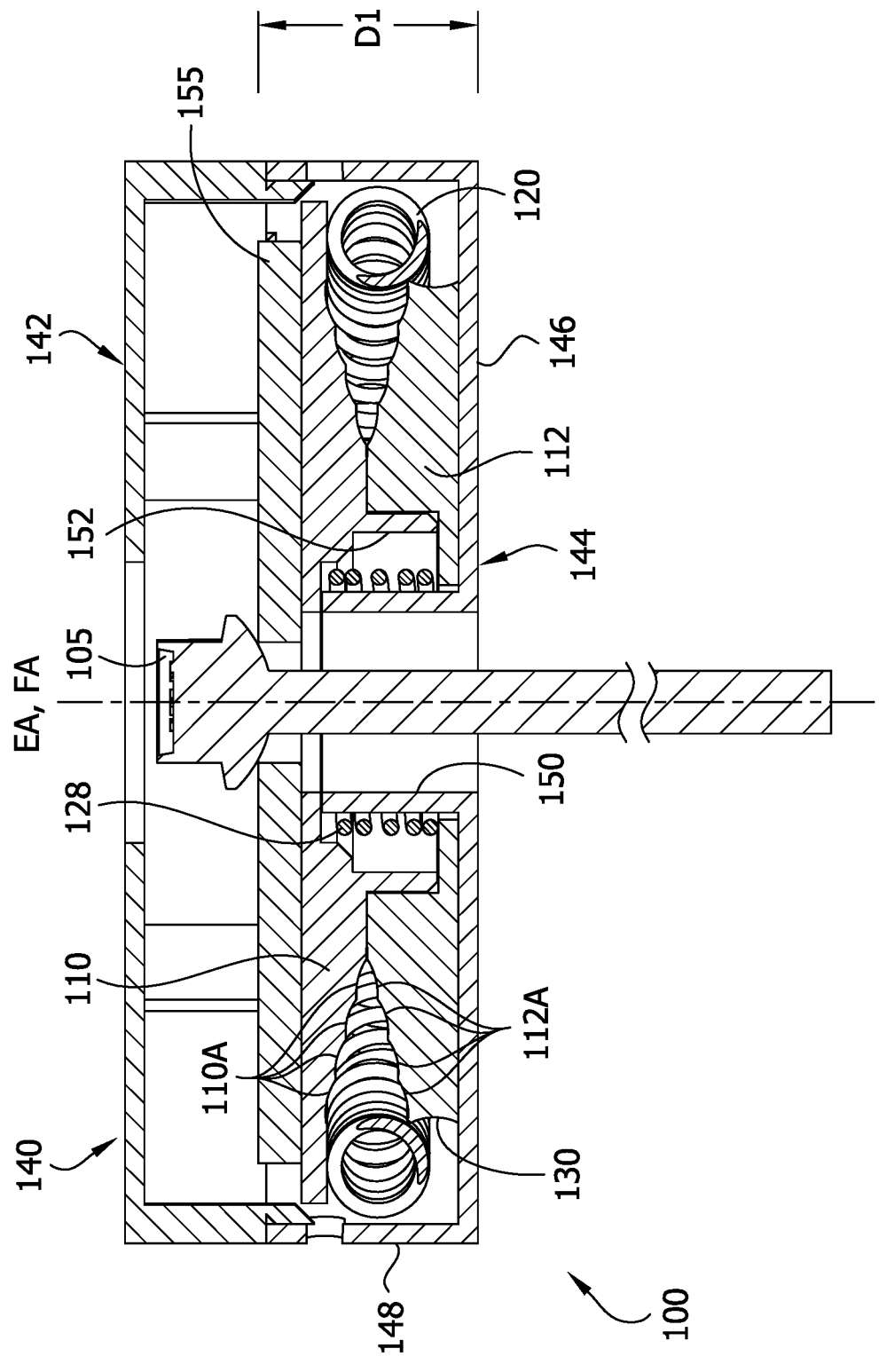
FIG. 5 is a vertical section of the expandable washer receiving a fastener that has moved the expandable washer to the activated state.

Referring to FIGS. 2-7, an expandable washer 100 can be used with a fastener 105 for connecting to one or more components (e.g., an upper wall UW and a lower wall LW, FIG. 1) to maintain a tight connection of the fastener with the component(s) over time as the components move or change in size. Stated another way, the expandable washer 100 is operable to actively maintain tension in the fastener after connection to the component. The expandable washer 100 comprises a first expander member or disk 110 and a second expander member or disk 112. The first disk 110 is operatively connected to the second disk 112 for relative movement with respect to each other along an expansion axis EA parallel to or (as shown herein) coincident with a fastener insertion axis FA (FIGS. 4 and 5). The first disk 110 and second disk 112 are in generally opposed relation and may move relative to one another along the expansion axis EA. The first and second disks 110, 112 cooperatively define a channel 115 having a dimension parallel to the expansion axis EA which decreases from a location remote from the expansion axis to a location closer to the expansion axis. Thus, the channel 115 gets narrower toward the center of the expandable washer. Facing surfaces of the first and second disks 110, 112 are closer together near the expansion axis EA than at the peripheries of the first and second disks. The facing surfaces have a generally short, conical shape. The first disk 110 and second disk 112 are configured to allow the fastener 105 to pass through the first and second disks to the component(s). The fastener 105 can operatively engage the first disk 110 for moving with the first disk, and the first disk applies reaction force to the fastener to place the fastener in tension when the fastener is connected to the component. The first and second disks 110, 112 may be shaped and arranged other than described, for example and without limitation, only one of the disks may be conically shaped.

Figure 1:
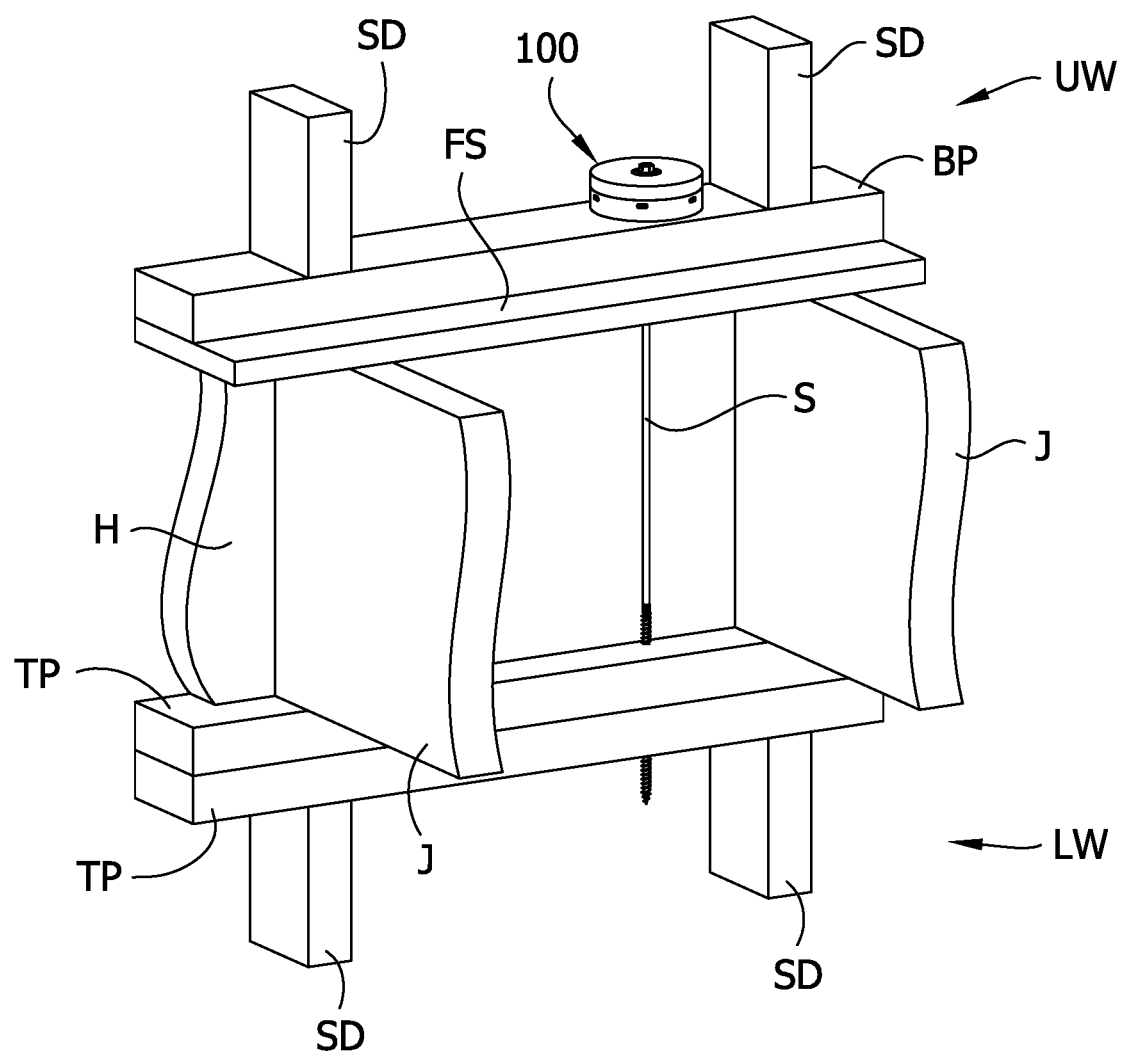
FIG. 1 is a fragmentary perspective of walls and floor joists of two stories of a wood frame structure connected together vertically by a long screw and expandable washer.
Figure 2:
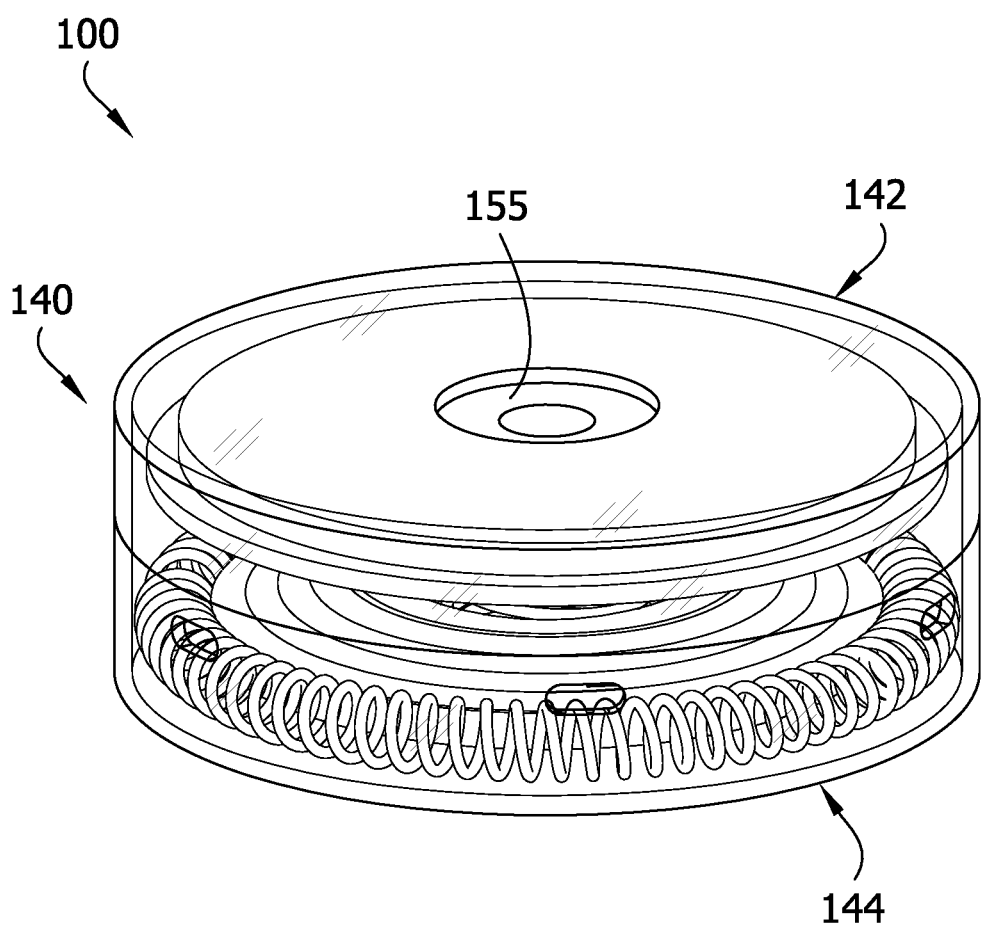
FIG. 2 is a perspective view of the expandable washer with an upper housing portion thereof being shown as transparent to reveal internal construction.
Figure 3:
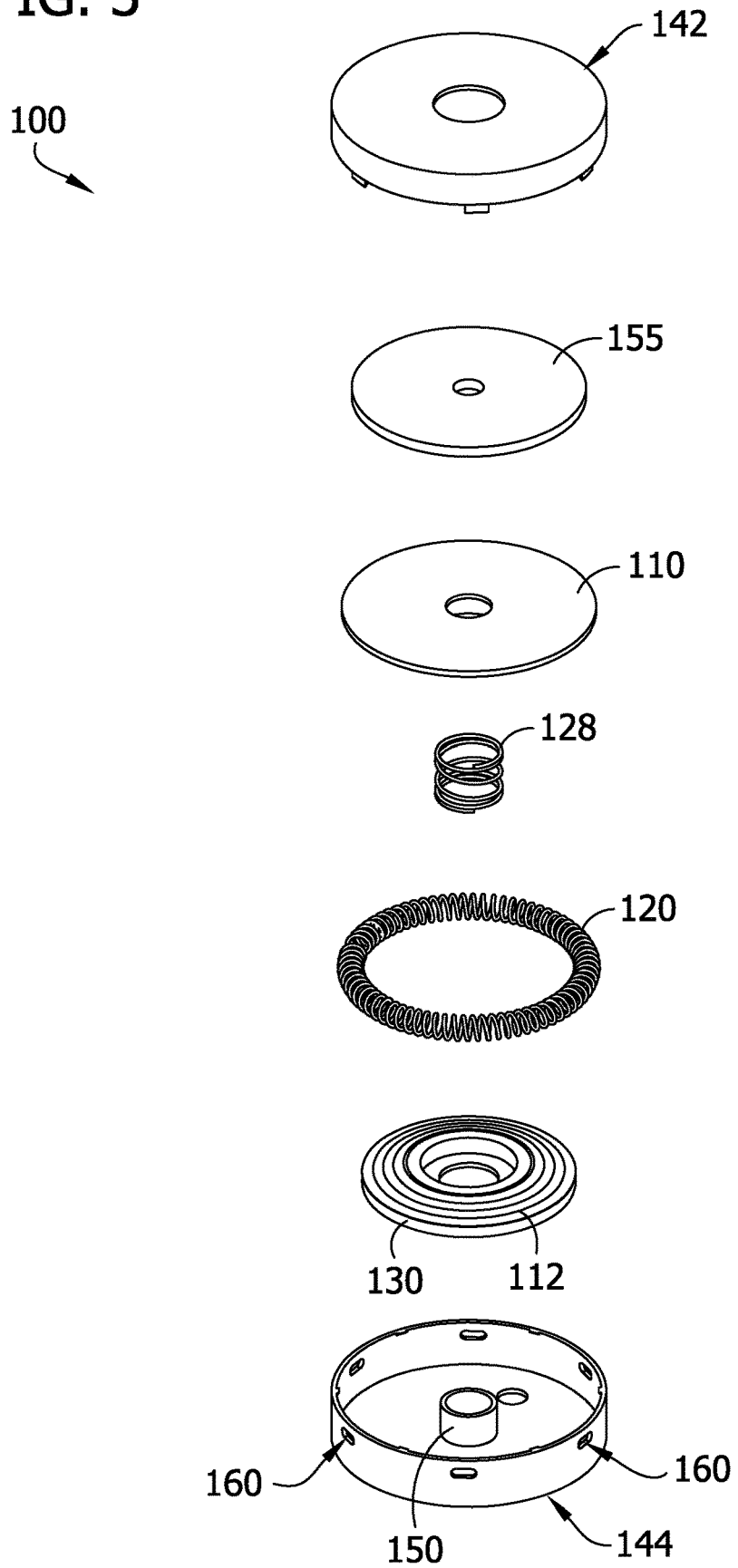
FIG. 3 is an exploded perspective of the expandable washer.

The expandable washer 100 of the present invention is shown in FIG. 1 used in the context of a long screw S connecting an upper wall (generally indicated at UW) and a lower wall (generally indicated at LW). The upper wall UW includes studs SD and a bottom plate BP that rests upon floor sheathing FS. The floor sheathing overlies joists J attached to a rim board or header H. The lower wall LW also has studs SD and two top plates TP. The header H is located between the uppermost top plate TP of the lower wall LW and the floor sheathing. The long screw S extends through the bottom plate BP of the upper wall UW, and the floor sheathing FS down to the top plate TP of the lower wall LW. The end of the screw penetrates both of the top plates and is connected to the top plates by the threads of the long screw S. The expandable washer 100 is used at the head of the screw to make contact with the upper wall UW. The upper wall UW, floor sheathing FS and lower wall LW (all directly connected by the long screw S), as well as the header H and joists J can be considered "components" for purposes of the present invention. Moreover, parts making up each of the upper wall UW, floor sheathing FS, joists J, header H and lower wall LW may also be considered to be "components." It will be understood that the expandable washer may be used in other connections than the one illustrated in FIG. 1. The components of FIG. 1 can be made of wood. Over extended periods of time, the wood may lose internal moisture and shrink in overall dimension while the screw remains dimensionally unchanged. In the absence of the expandable washer 100, this could lead to loss of contact of the head of the washer with the bottom plate BP of the upper wall UW. The connection of the upper wall UW to the lower wall LW would then become loose. However, as explained more fully hereinafter, the expandable washer 100 is capable of taking up this dimensional variation in order to maintain a snug connection of the components.

The expandable washer 100 further comprises a coil spring 120 (broadly, a "cam") located radially outward from the expansion axis EA and biased for movement toward the expansion axis. While the coil spring 120 moves toward the expansion axis EA, the coil spring moves between the first disk 110 and second disk 112, acting as a cam to drive the first and second disks apart. By driving the first disk 110 and second disk 112 apart, the application of force to keep the fastener 105 in tension with the first disk is maintained when the fastener is received through the expandable washer 100 and connected to the component. Additionally, when the axial load applied to the fastener exceeds the cam force from the spring, the spring transfers this load from first disk 110 to the second disk 112 by trying to bend and compress the spring perpendicular to the helical axis. This eliminates the need for a rigid wedge or wedges to transfer the load. Other configurations of a mechanism for camming the first and second disks apart may be employed within the scope of the present invention. In some embodiments, the disks may be oblong in shape (not shown) or additional disks and coil springs may be stacked inline with the expansion axis EA (not shown) to allow for further internal shrinkage of the wood components. In at least one embodiment of the invention, rigid wedges may be employed.

The expandable washer 100 further comprises a locking structure, which in the illustrated embodiment takes the form of a recess 130 in the peripheral edge of the second disk 112. The locking structure has a locked position (FIG. 4) in which the coil spring 120 is restrained by the recess 130 and the expandable washer 100 is not activated. The restraint of the coil spring 120 by the recess 130 (broadly, a "cam retainer") prevents the coil spring from movement toward the expansion axis EA. The locking structure also has an unlocked position (FIG. 5) in which the recess 130 does not restrain movement of the coil spring 120 toward the expansion axis EA. The locking structure is configured to move from the locked position to the unlocked position by movement of the second disk 112 toward the component through the operative engagement of the first disk 110 by the fastener 105 when the fastener is being connected to the component. The recess 130 extends circumferentially around the entire periphery of the second disk 112. The recess 130 has an arcuate cross section for initially retaining the spring 120 in the recess.

The spring 120 has a generally circular shape and is biased through a spring force of the spring to contract from a larger diameter to a smaller diameter. The spring 120 is received by the recess in the recess 130 while in the locked position (unactivated state). The resiliency of the spring 120 causes the spring to bear firmly against the perimeter of the second disk 112. In this way, the spring 120 assists in holding itself in the recess 130 in the locked position. The second disk 112 is movable to change the state of the expandable washer 100 from the unactivated state to an activated state, as will be describe more fully hereinafter. The second disk 112 actuates the spring 120 to move from the locked position to the unlocked position as the second disk moves from the unactivated position to the activated position. The first disk 110 is configured to push the second disk 112 from the unactivated position to the activated position upon the operative engagement of the first disk by the fastener 105 when the fastener is being connected to the component.

In the illustrated embodiments, the expandable washer 100 further comprises a housing portion 140 enclosing the first and second disks 110, 112, and coil spring 120. The housing portion 140 has an upper housing portion 142 and lower housing portion 144, which are connected together to define an interior space that receives and contains the first and second disks 110, 112, and coil spring 112. The locking structure in the form of the recess 130 on the second disk 112 is also contained in the interior space. The upper housing portion 142 and lower housing portion 144 each has a fastener opening which is aligned with the fastener insertion axis FA. The lower housing portion 144 has a lower surface configured to abut or engage the component. The lower housing portion 144 may be considered, broadly, a component engagement member through which the compressive force of the fastener 105 is applied to the component. The lower housing portion 144 has a bottom wall 146 with a generally planar lower surface that engages the component when the expandable washer 100 is used with the fastener to secure the component.

The lower housing portion 144 includes an annular rim 148 extending upward from the bottom wall 146. The upper housing portion 142 has a side wall 143 that extends downward from a top surface of the upper housing portion. Spaced apart tabs 143A depend from the lower edge of the side wall 143. When the upper and lower housing portions 142, 144 are brought together, the side wall 143 engages the top of the rim 148 of the lower housing portion 144. The tabs 143A slide into the interior of the rim 148 and engage the interior of the rim to facilitate an interference fit with the rim to connect and align the upper and lower housing portions.

The expandable washer 100 further includes a tubular shaft portion 150 projecting upward from a lower interior surface of the lower housing portion 144. The second disk 112 has a central opening that receives the tubular shaft portion 150 through the second disk. The second disk 112 is movable on the shaft portion 150 along the expansion axis EA. The first disk 110 has a central opening defined by a downwardly projecting tubular shaft portion 152 that is telescopingly received in the tubular shaft portion 150 of the lower housing portion 144. The first disk 110 is movable along the extension axis EA, guided by engagement of its tubular shaft portion 152 in the tubular shaft portion 150 of the lower housing portion 144. Other configurations of the first and second disks may be employed.

The expandable washer further comprises a head support 155 disposed between the first disk 110 and an upper interior surface of the housing 140. The head support is configured to engage a head of the fastener 105 for transferring force between the head of the fastener and the head support, to the first disk 110. The head support 155 has a central opening that receives a shaft of the fastener 105, but not the head of the fastener, which engages an upper surface of the heat support. The upper housing portion 142 also has a central opening that passes the entire fastener 105 into the expandable washer 100. The central opening of the upper housing portion 142, the central opening and tubular shaft portion 152 of the first disk 110, the central opening of the second disk 112 and the tubular shaft portion 150 of the lower housing portion 144 define a passage that receives the shaft of the fastener 105 completely through the expandable washer 100.

The expandable washer 100 further comprises a second spring 128 between the first disk 110 and the second disk 112. The second spring 128 biases the first and second disks 110, 112 apart. The second spring 128 extends between the first and second disks 110, 112 and is configured to push the first and second disks apart. The second spring 128 holds the first disk 110, the second disk 112, and the head support 155 in the initial or pre-installed configuration as seen in FIG. 4. In the initial configuration, the second spring 128 pushes the second disk 112 downward and the first disk 110 upward. The second spring 128 pushes the second disk 112 downward until the second disk engages the bottom of the housing 140 and holds the second disk 112 in this position. The second spring 128 further pushes the first disk 110 upward until the head support 155 engages the top of the housing 140 and holds the first disk in this position. In the initial configuration, the second spring 128 holds and secures the first and second disks 110, 112 and the head support 155 in place to prevent these components from moving within or rattling around the interior of the housing 140 before the expandable washer 100 is installed. The second spring may take other forms or not be used at all in some embodiments.

One example of an alternative form, is a wave spring instead of coil spring as shown in the illustrated embodiment. In other embodiments, the spring 128 could be used in place of the spring 120. In those embodiments, any applied axial load exceeding the combined cam force of spring 120 and axial force from spring 128 is transferred from first disk 110 to the second disk 112 by spring 128 resisting the bending and compressive forces applied perpendicular to the helical axis of the spring 128.

Referring to FIG. 4, the expandable washer 100 is in the initial unactivated state. This is the configuration of the expandable washer 100 off-the-shelf. In this configuration, the spring 120 is held in the peripherally outward facing recess of the spring retainer 130 of the second disk 112. When the spring 120 is in the recess, the spring is inhibited from moving inward toward the expansion axis EA. Moreover, in the locked position (unactivated state of the expandable washer 100) the spring 120 has no effect on the relative movement of the first and second disks 110, 112. The spring 120 further supports and holds the second disk 112 in a spaced apart relation with the bottom of the housing 140. The spring 120 extends below the second disk 112 and rests on the bottom of the housing 140. In operation, the fastener 105 is fed through the housing 140, head support 155, the first disk 110 and the second disk 112 in order to connect to a component.

Referring to FIG. 5, the fastener 105 has caused the expandable washer 100 to move from the unactivated state to the activated state as the fastener 105 is connected to (e.g., driven into) the component. As the fastener 105 is tightened against the component, the head of the fastener applies force to the head support 155. The force applied by the fastener 105 causes the head support 155 to apply force to the first disk 110. The second spring 128 preferably has a sufficiently low spring constant to permit the fastener 105 to compress the second spring with reasonably low force as the fastener is tightened to the component. As the head support 155 and first disk 110 are forced toward the bottom of the housing 140, the first disk bottoms out on the second disk 112. From this point, the first and second disks 110, 112 move conjointly toward the lower housing portion 144 as the fastener 105 continues to be tightened. However, the spring 120 already engages the lower housing portion 144. The recess 130 of the second disk 112 moves down causing the spring 120 to move out of the recess, thereby changing the expandable washer from the unactivated state to the activated state. When the spring 120 moves from the locked position to the unlocked position as the second disk 112 moves down, the spring moves into the channel 115. In the activated state, the compressive force of the fastener 105 generally keeps the spring 120 at the outer circumferential end of the channel 115, preventing the spring from pushing the first disk 110 and second disk 112 apart. In the installed configuration, the head support 155 is spaced apart from the bottom of the housing by a first distance D1. To ensure that the expandable washer 100 has been installed correctly, witness holes 160 may be disposed around the perimeter of the housing 140 permit the user to visually inspect the expandable washer to confirm the spring 120 is released and in the proper place after installation.

Figure 6:
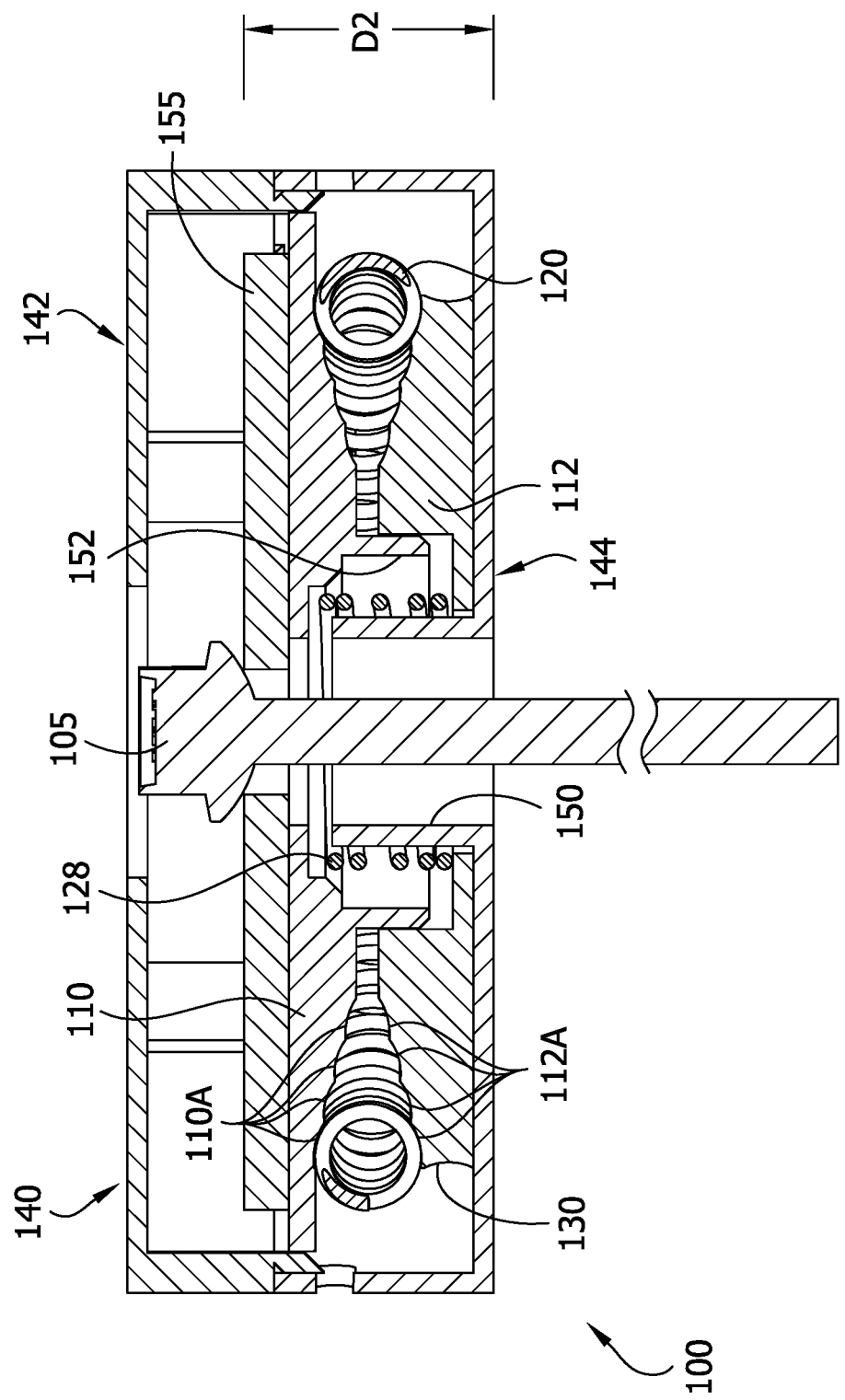
FIG. 6 is the vertical section of FIG. 5, but illustrating the activated expandable washer in an intermediate expanded position.

Referring to FIG. 6, the condition of the connection being made with the component(s) using the fastener 105 and expandable washer 100 has changed so that the distance between the head of the fastener and the component has increased. As the distance between head of the fastener 105 and the component increases, the spring 120 contracts radially under its own spring force toward the expansion axis EA. The movement of the spring 120 radially toward the expansion axis EA moves the first and second disks 110, 112 apart from each other in order to maintain the contact between the head support 155 and the head of the fastener 105. In the illustrated embodiment, as a result of the contraction of the spring, the head support 155 and the bottom of the housing 140 are now spaced apart by a second distance D2, where D2 is greater than D1. In the illustrated embodiments, both or the first disk 110 and the second disk 112 are formed with concentric grooves 110A, 112A. Pairs of concentric grooves (one on the first disk 110 and one on the second disk 112) are arranged to sequentially receive and releasably retain the spring 120 in a radial position with respect to the expansion axis EA. The grooves 110A, 112A help to control the spring 120 as it advances toward the expansion axis over the life of the connection made using the expandable washer 100. It will be understood that other structures could be used to control movement of the spring, or that such structure could be entirely omitted within the scope of the present invention.

Figure 7:
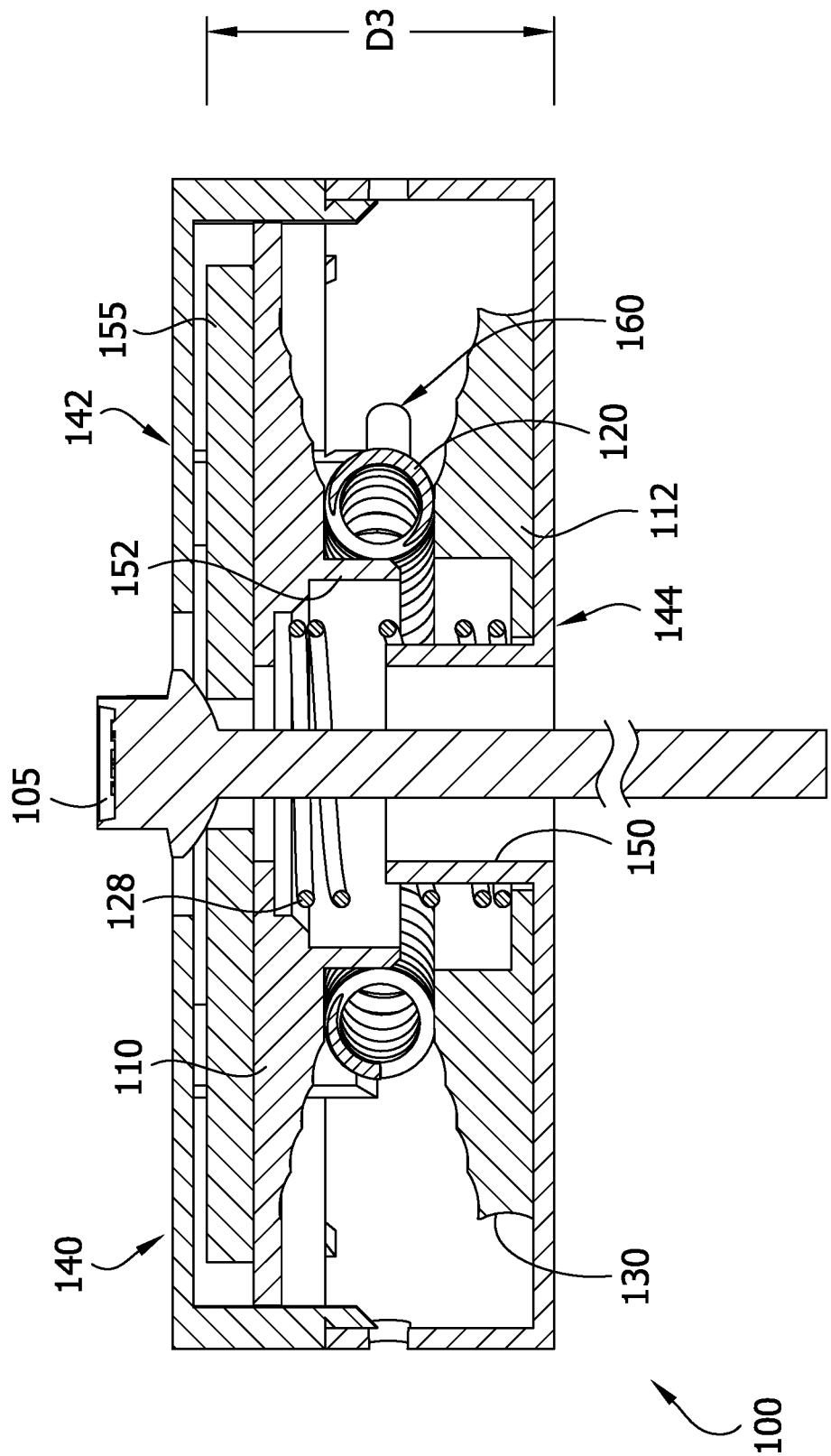
FIG. 7 is the vertical section of FIG. 5, but illustrating the activated expandable washer in a final expanded position.
Figure 8:
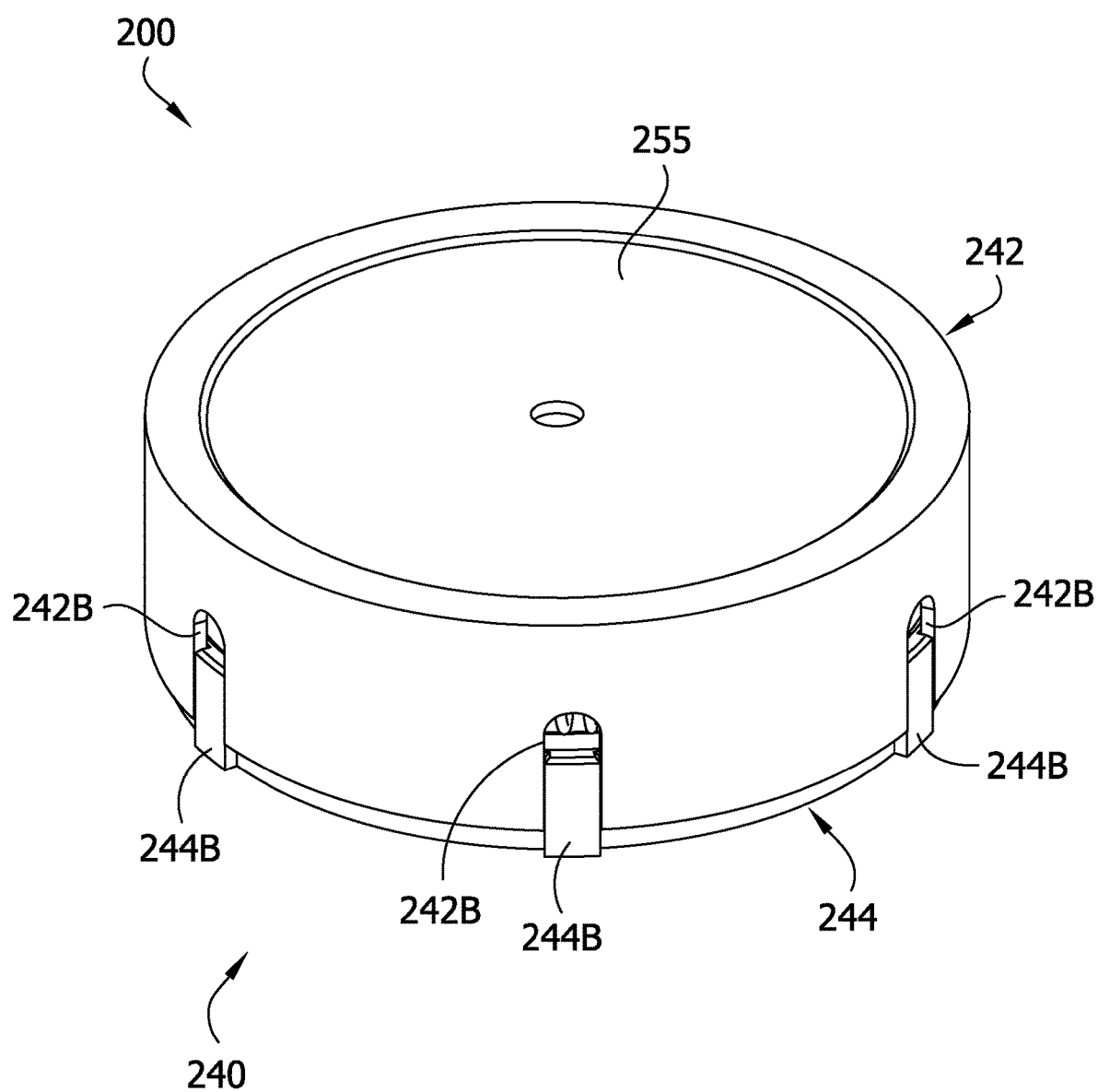
FIG. 8 is a perspective of an expandable washer of yet another embodiment.

Referring to FIG. 7, the expandable washer 100 is in its most fully expanded configuration. Preferably, this position would never be reached over the life of the connection. In this configuration, the distance between the head of the fastener 105 and the component has continued to increase. To compensate for the movement of the fastener 105, the spring 120 has continued to contract to increase the expansion of the first and second disks 110, 112 and has moved to the inner most step of the first and second disks. As a result of the contraction of the spring 120, the head support 155 is spaced apart from the bottom of the housing 140 by a third distance D3. D3 is greater than distances D2 and D1. In one embodiment, the difference between the first distance D1 and the third distance D3 is about ½ inch (13 mm). In other words, in this embodiment, the expandable washer 100 can accommodate a fastener 105 that moves a maximum of about ½ inch (13 mm). Other dimensions are within the scope of the present disclosure.

Accordingly, the expandable washer 100 of the present disclosures is able to adjust to ensure the head of a fastener 105 remains in tension and tightly engaged with the component the fastener is connected to. The expandable washer 100 is able to transmit the compressive force from the head of the fastener 105 to the component, even if the head of the fastener moves away from the component, in order to maintain the strength of the connection provided by the fastener between the component. It is noted that once the spring 120 moves into the channel 115, the compressive force applied from the head of the fastener 105 travels through the spring 120. Thus, the spring becomes part of the force path of the fastener 105. In particular, the force is transferred through the spring 120 perpendicular to the lengthwise extent of the spring.

Referring now to FIGS. 8-16, another embodiment of the expandable washer 200 has a construction and operation that is closely similar to the expandable washer 100 of FIGS. 1-7. The expandable washer 200 is particularly configured to stabilize the components of the expandable washer so as to improve the load capacity of the washer, as will be described more fully hereinafter. Parts of the expandable washer 200 corresponding to the expandable washers 100 are given the same reference numerals, plus "100."

Figure 9:
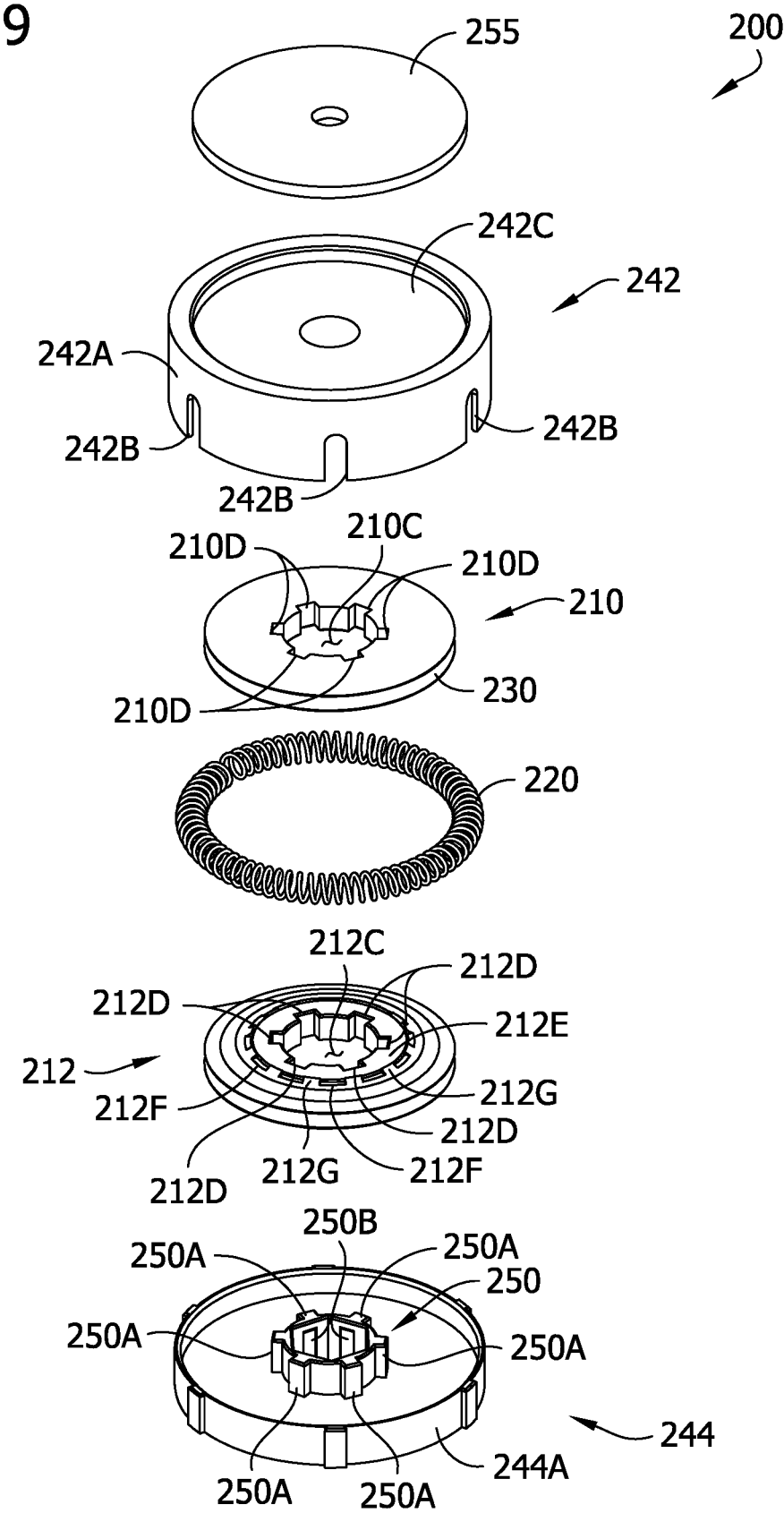
FIG. 9 is an exploded perspective of the expandable washer of FIG. 8.
Figure 10:
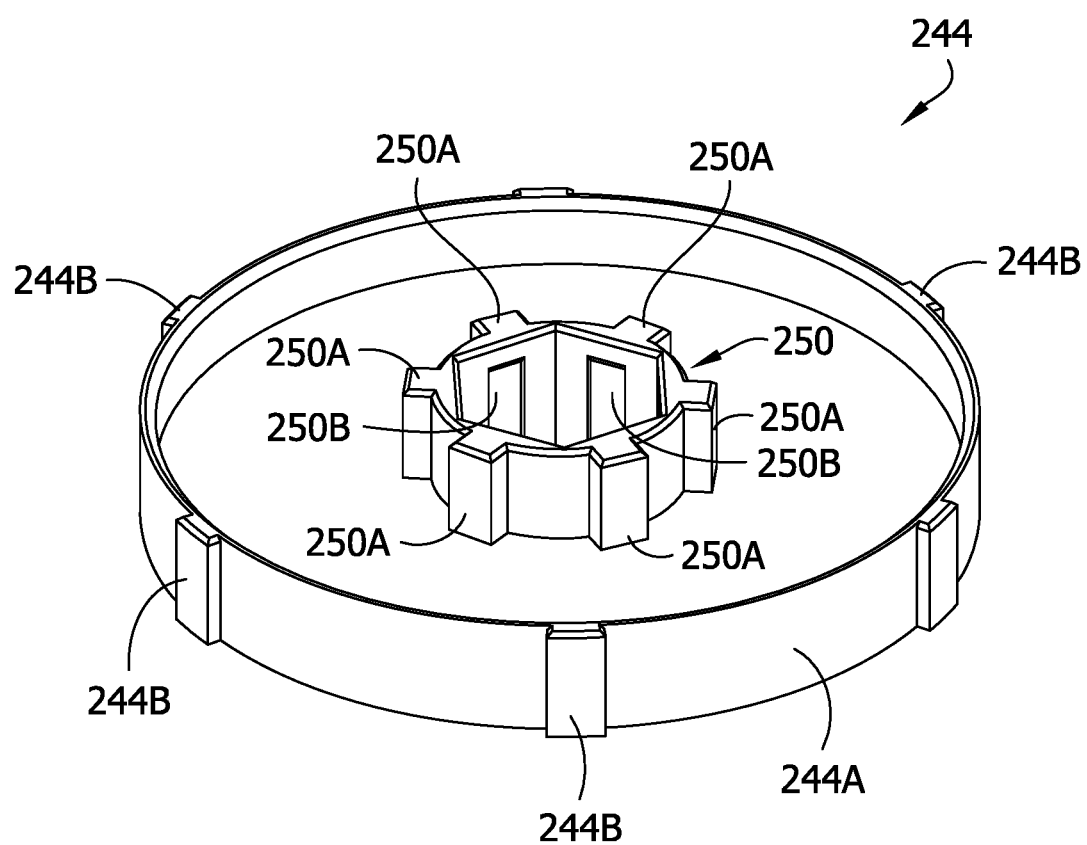
FIG. 10 is a top side perspective of a lower housing portion of a housing of the expandable washer of FIG. 8.
Figure 11:
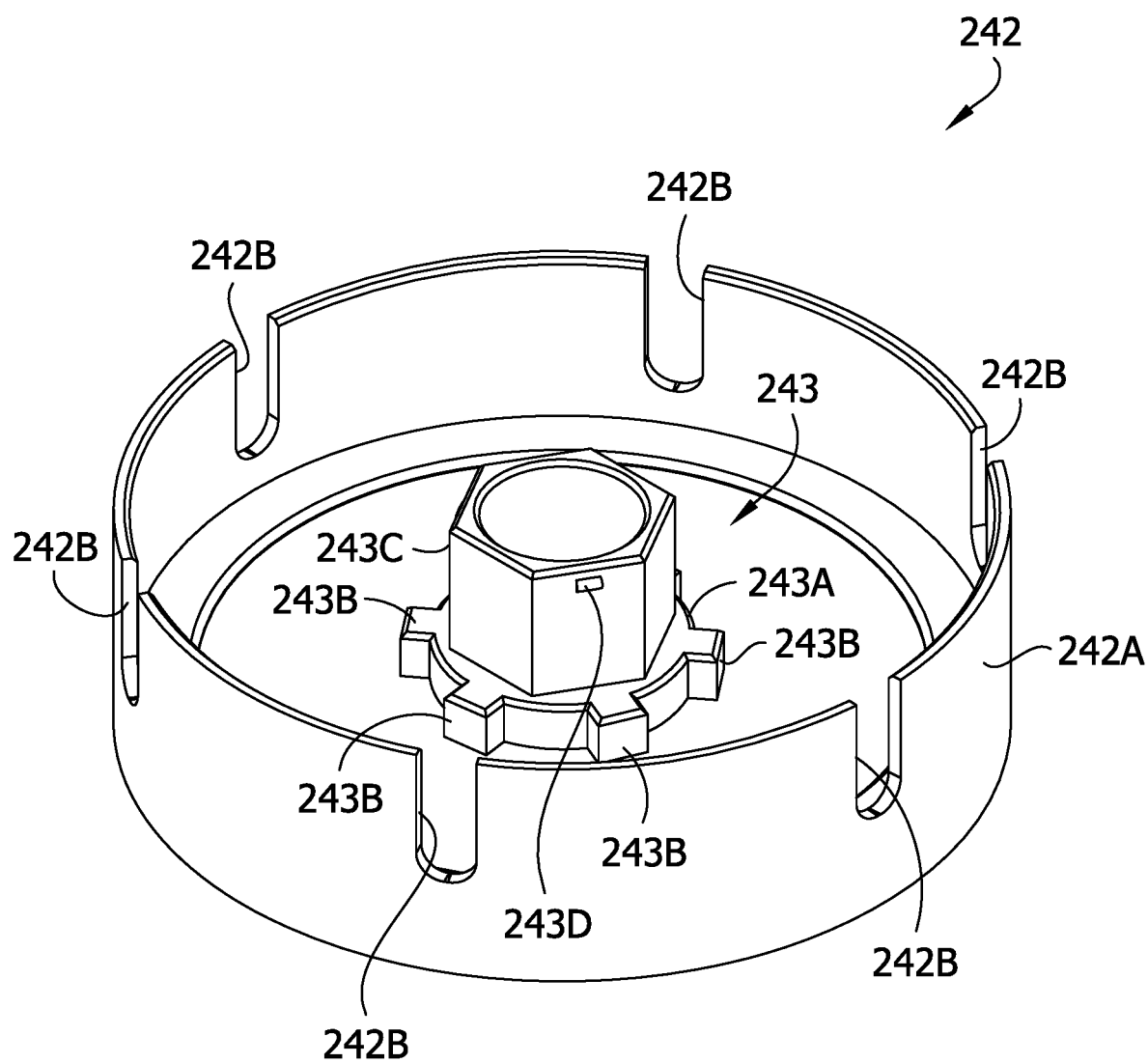
FIG. 11 is a bottom side perspective of an upper housing portion of the housing.
Figure 12:
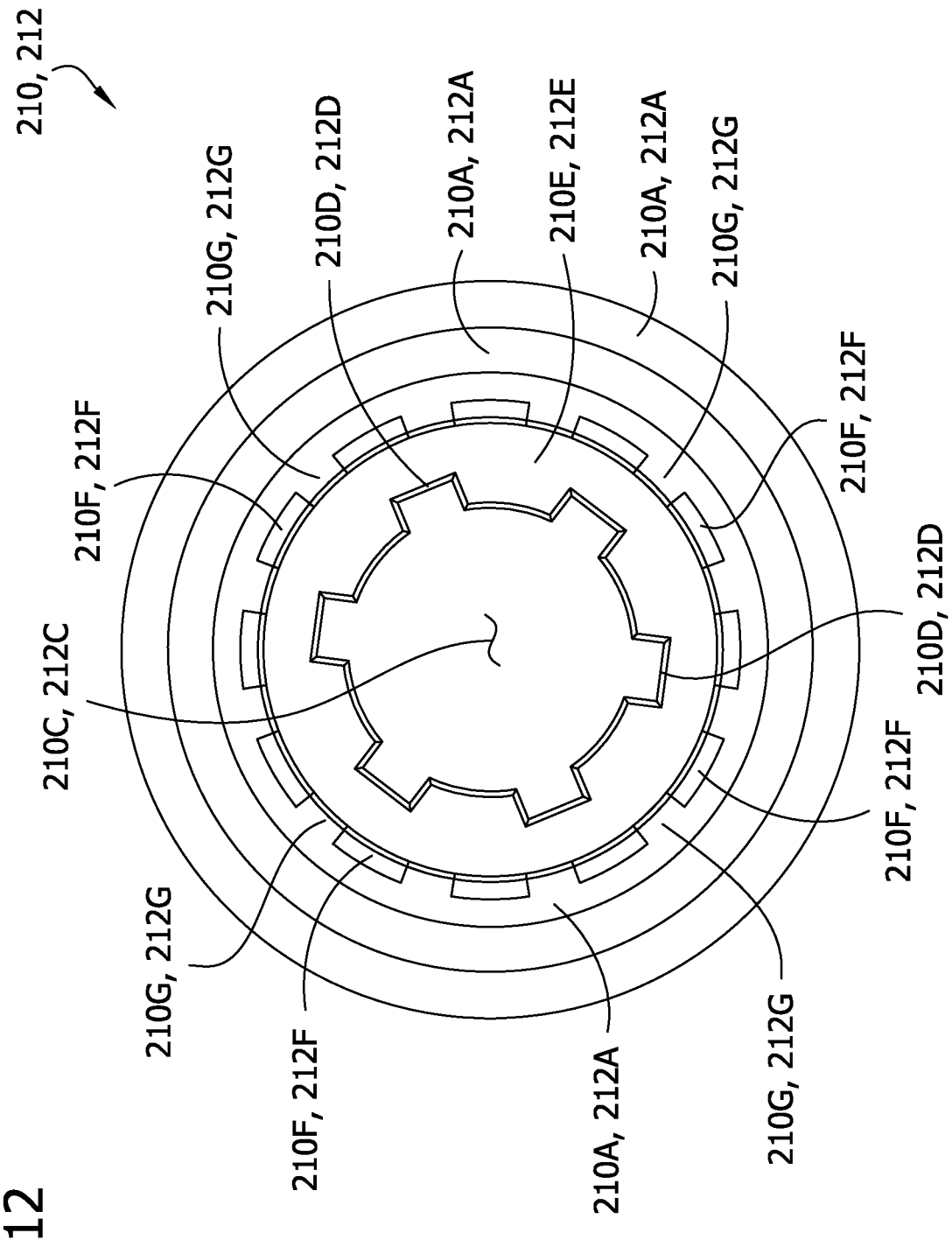
FIG. 12 is a bottom plan view of a disk of the expandable washer of FIG. 8.
Figure 13:
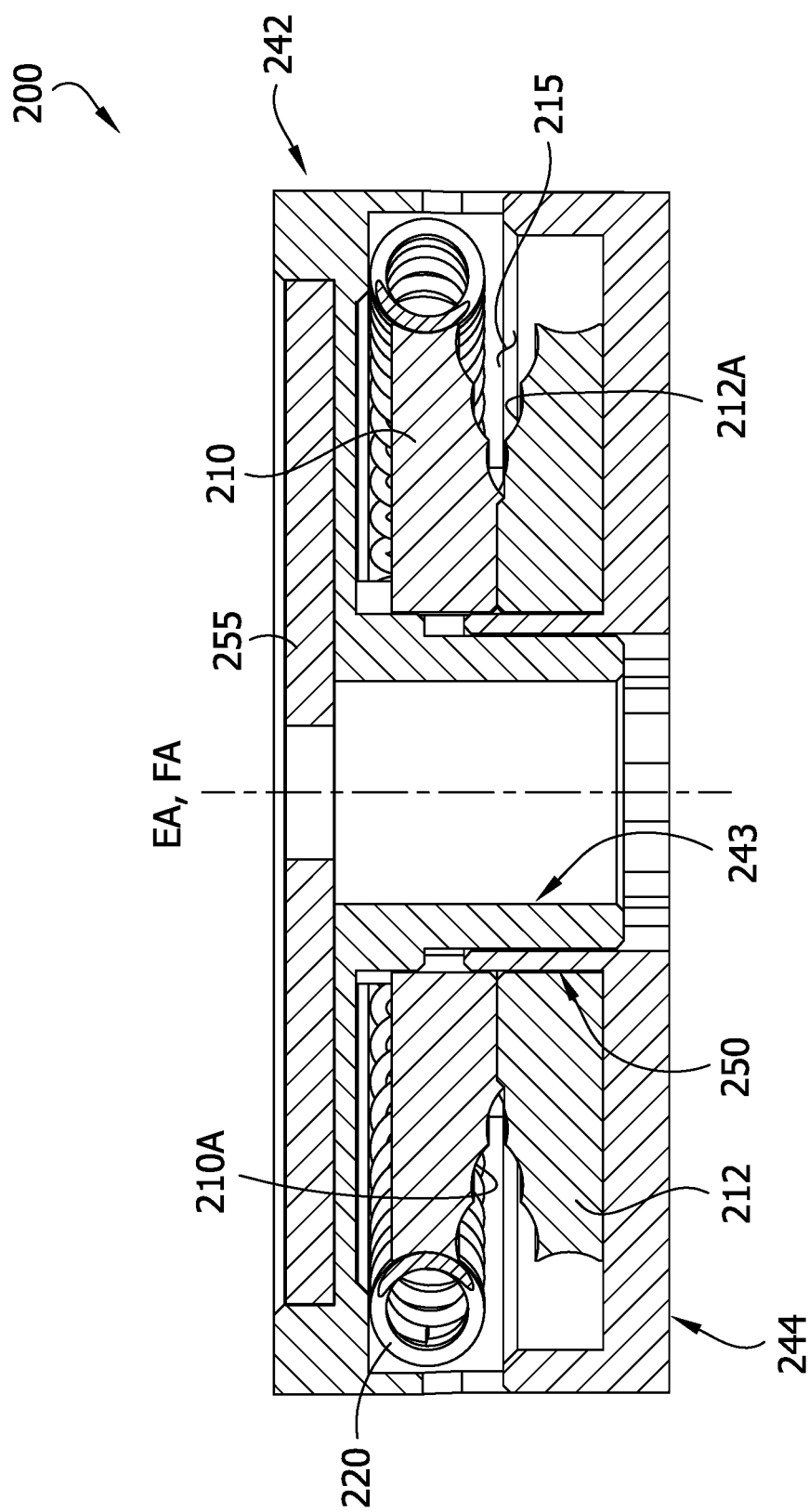
FIG. 13 is a vertical section of FIG. 8 embodiment in the unactivated state.
Figure 14:
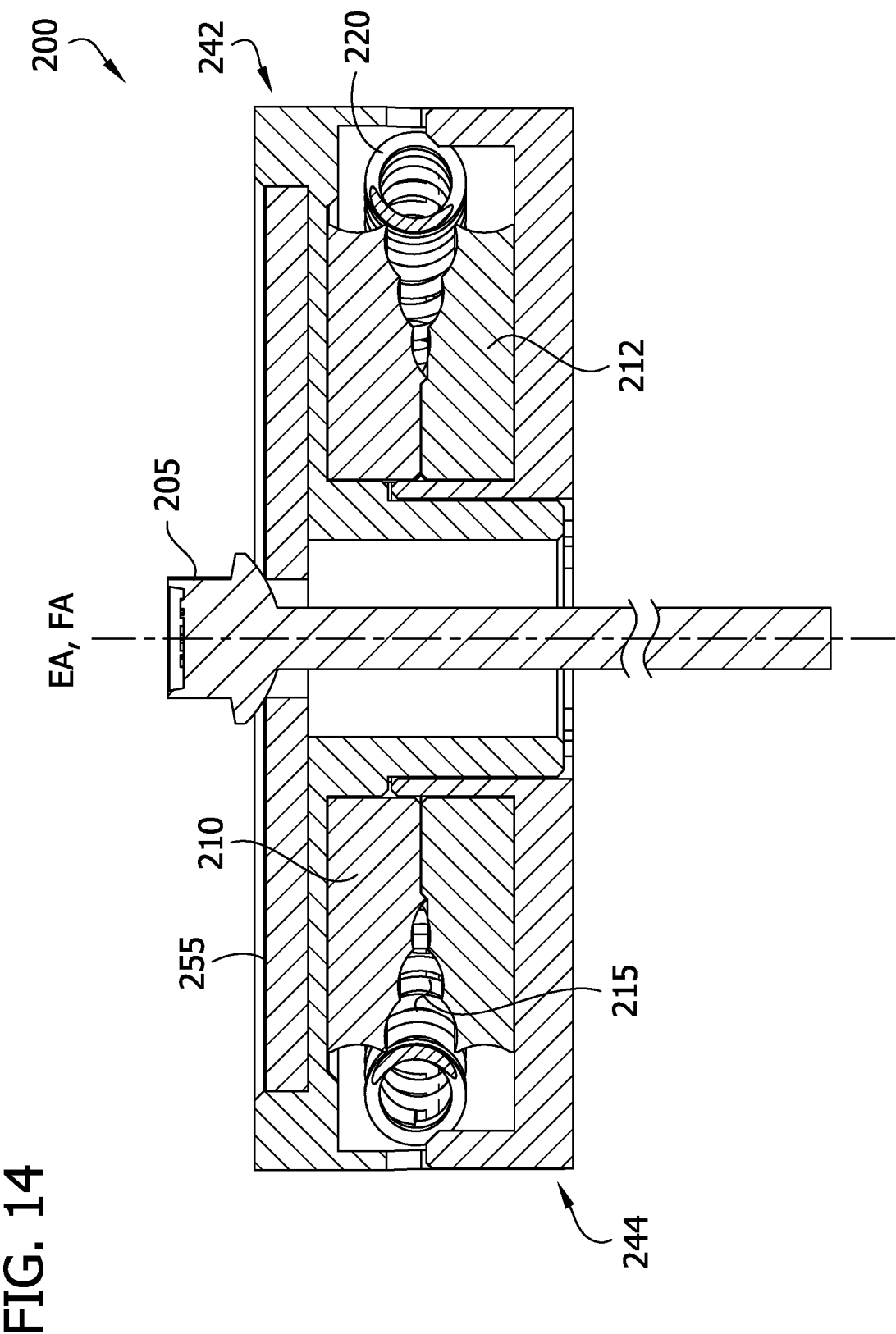
FIG. 14 is the vertical section of FIG. 13, but illustrating the fastener having moved the expandable washer to the activated state.
Figure 15:
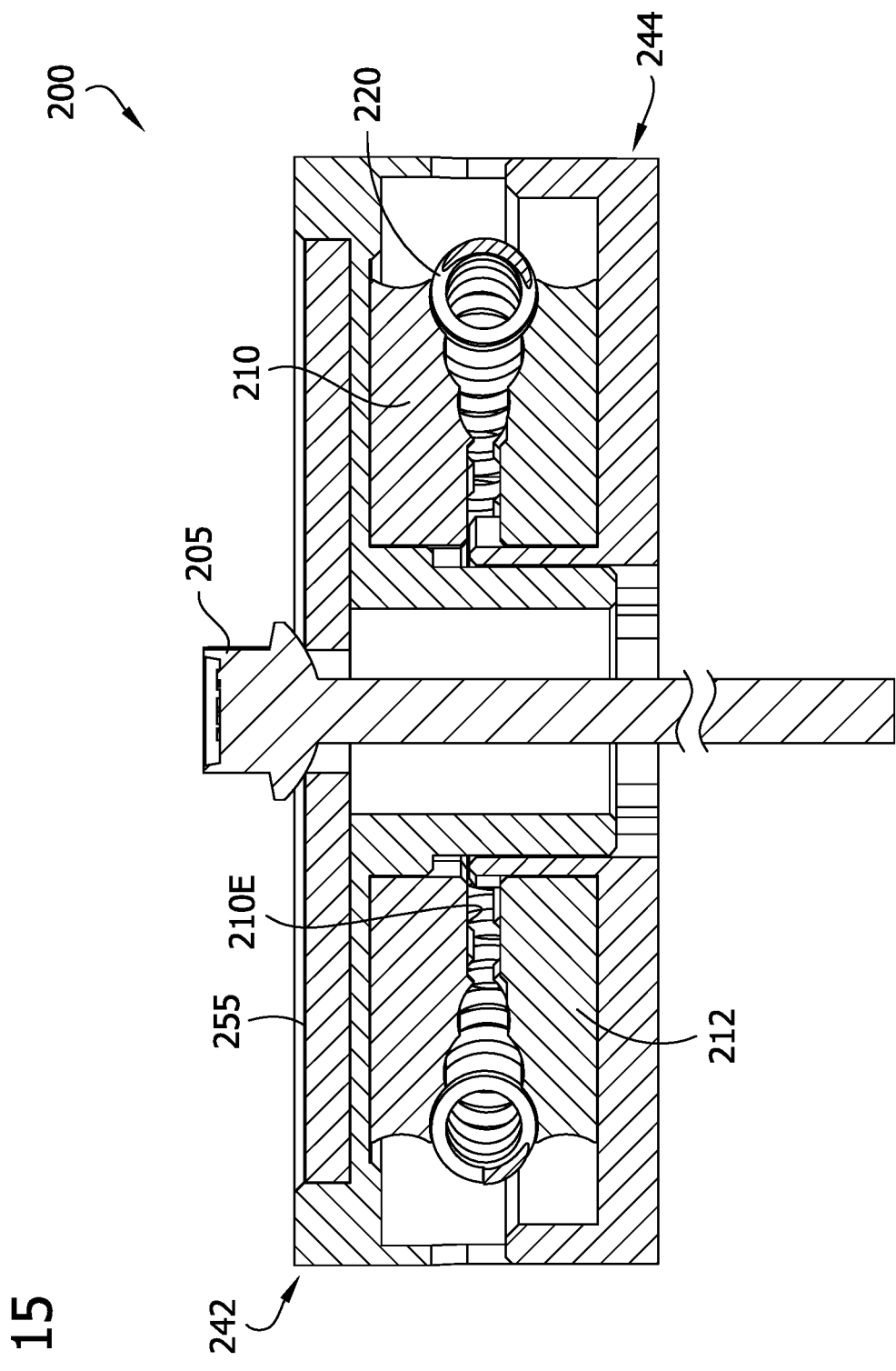
FIG. 15 is the vertical section of FIG. 14 but illustrating the activated expandable washer in an intermediate position.

The expandable washer 200 includes first and second disks 210, 212 (broadly, "expander members") mounted for movement along the expansion axis EA. In this embodiment, the first and second disks are each of identical construction, and so a description of the first disk suffices for both. Referring to FIGS. 9 and 12, the first disk 210 has a central opening 210C that is generally round, but has six radially extending slots 210D (broadly, "anti-rotation elements") configured for preventing rotation of the first disk. As with the other embodiments, the interior surface (i.e., the surface of each disk that faces the other disk) has a short conical shape. A portion 210E of the first disk 210 including and surrounding the central opening 210C is flat and recessed axially. Thus, the maximum axial dimension of the first disk 210 is located radially outward from the central opening. At the boundary of the conical portion of the first disk 210 and the flat center portion 210E are a series of recesses 210F arranged in a circle around the central opening 210C. The recesses 210F are separated by tabs 210G. As may be seen in FIG. 12 the recesses 210F and tabs 210G are rotationally offset from the slots 210D. As a result, when the first and second disks 210, 212 are brought together so that the central opening 210C and slots 210D are aligned, the tabs 212G of the second disk 212 are received in the recesses 210F of the first disk 210, and the tabs 210G of the first disk are received in the recesses 212F of the second disk. In the initial position of the first and second disks 210, 212, the disks are closer together as a result of this arrangement, which desirably produces a slightly longer distance that the disks may travel with respect to each other along the expansion axis EA. As mentioned above, the first disk 210 and the second disk 212 are of identical construction so each includes a central opening 210C, 212C, slots 210D, 212D, a flat center portion 210E, 212E, recesses 210F, 212F, and tabs 210G, 212G. Other configurations are permissible within the scope of the present invention, including without limitation, have the second disk be formed as part of the lower housing portion.

The expandable washer 200 has a housing 240 comprising an upper housing portion 242 and a lower housing portion 244. The lower housing portion 244 has a tubular shaft portion 250 projecting upward from an interior surface of the lower housing portion 244. The shaft portion 250 has a generally round exterior, but further includes axially extending splines 250A projecting from the exterior. Interior walls of the tubular shaft portion 250 are arranged in a hexagonal shape. The interior walls have axially elongate grooves 250B formed in them. The upper housing portion 242 also has a tubular shaft 243 projecting from an interior surface of the upper housing portion 242. The tubular shaft 243 has a first portion 243A immediately adjacent to the interior surface of the upper housing portion 242. The first portion 243A has a round exterior, but further including splines 243B, closely similar to the splines 250A of the shaft portion 250 of the lower housing portion 244. A second portion 243C of the shaft 243 is smaller in diameter than the first portion 243A, and has a hexagonal exterior surface. Three of six flat panels forming the hexagonal exterior surface of the second portion 243C are formed with a catch 243D (only one of which is shown in the drawings). The second portion 243 is sized and shaped to be received in the hexagonal interior of the tubular shaft portion 250. The catches 243D snap into the grooves 250B on the interior of the first shaft portion 250. The catches 243D permit relative movement along the expansion axis between the upper housing portion 242 and the lower housing portion 244, but the catches limit this movement when they reach the upper ends of the grooves 250B and retain the connection of the upper and lower housing portions 242, 244. The polygonal shapes of the second portion 243C of the tubular shaft 243 mating in the interior of the tubular shaft portion 250 act to resist relative rotation of the tubular shaft portions 243, 250, and thereby resist relative rotation of the upper and lower housing portions 242, 244. It will be understood that the shaft portions 243, 250 of the upper and lower housing portion 242, 244 may have other configurations than in the illustrated embodiments.

The upper housing portion 242 includes a downwardly extending skirt 242A. Six inverted U-shaped cutouts 242B formed in the skirt 242A open at the lower edge of the skirt. The lower housing portion 244 has an upwardly projecting skirt 244A. Six axially extending rails 244B project from the skirt 244A. The axially extending rails 244B are received corresponding ones of the downwardly opening cutouts 242B. The engagement of the rails 244B in the cutouts 242B permit relative axial movement of the upper and lower housing portions 242, 244, but strongly resist relative rotation. As will be understood several features are provided to resist rotation. Other configurations to resist or limit relative rotation of the components of the expandable washer 200 may be used. Control of rotation improves the ability of the expandable washer 200 to resists loads. As may be seen in FIGS. 15 and 16, the coil spring 220 is in the force path between the first disk 210 and the second disk 212. The individual coils of the spring 220 are able to transfer the load without failing particularly well when the individual coil is nearly vertical. It will be appreciated that because the coil spring 220 is helical in shape, the individual coils will not be precisely vertical, but will depart from vertical. However, if relative rotation of the first and second disks 210, 212 were permitted, this would result in the individual coils laying over even further away from a true vertical position. Once the coils are laid over too far, the large forces between the first and second disks 210, 212 will deform the coils so that they essentially lay flat (i.e., have an essentially horizontal orientation). When that occurs, the spring 220 has failed and the expandable washer 200 is no longer operable. Preventing relative rotation as described previously herein protects the spring 220 from having its coils laid over too far and allows the spring to transmit very high loading forces without failure.

The operation of the expandable washer 200 to move from the locked or unactivated position of the spring 220 (e.g. FIG. 13) to an unlocked or activated position (e.g., FIGS. 14-16), also differs somewhat from the expandable washer 100 of FIGS. 1-7. In the locked position, the spring 220 is received and held in a recess 230 of the first disk 210, as may be seen in FIG. 13, rather than in the second disk 212. Moreover in this embodiment, the first and second disks 210, 212 abut each other and the second disk 212 engages the interior surface of the lower housing portion 244. Thus, relative movement of the first and second disks 210, 212 does not release or unlock the spring 220 from locking structure (e.g., the recess 230). As may be seen in both FIGS. 8 and 13, in the initial, unactivated state of the expandable washer 200, the upper housing portion 242 is spaced above the lower housing portion 244. Thus, further movement of the upper housing portion 242 toward the lower housing portion is permitted. In the locked position, the amount of force needed to move the spring 220 to the unlocked or activated position (e.g., FIGS. 14-16) is sizeable enough to prevent accidental activation during normal handling of the expandable washer.

The head support 255 in this embodiment is not located between the upper housing portion 242 and the first disk 210, but rather is located in a depression 242C formed on a top side of the upper housing portion. The head of a fastener 205 engages and bears against an upper surface of the head support 255. In the unactivated state of FIG. 13, the head support 255 bears directly against the upper housing portion 242 instead of directly against the first disk 210. Therefore, when the fastener 205 as received through the expandable washer 200 is being connected to a component, the head support 255 drives the upper housing portion 242 downward. In the initial state, the upper housing portion 242 is spaced from the first disk 210, but already engages the spring 220. Downward movement of the upper housing portion 242 thus drives the spring 220 downward, while the first disk 210 is held in place by virtue of its engagement with the second disk 212 resting against the interior surface of the lower housing portion 244. As a result, the spring 220 is pushed out of the circumferential recess 230 in the first disk 210 to the unlocked or activated position shown in FIG. 14. In this position it may be seen that the gap between the interior surface of the upper housing portion 242 and the upper surface of the first disk 210 is closed so that the compressive force applied by the head of the fastener 205 is transmitted to the head support 255, thence to the upper housing portion 242, the first disk 210, the second disk 212 and finally to the component on which the lower housing portion 244 rests (e.g., the bottom plate BP of the upper wall UW as shown in FIG. 1).

Once the expandable washer 200 is activated by pushing the spring 220 out of the recess 230 of the first disk 210, the operation of the expandable washer 200 is very similar to that of the expandable washer 100. Over time the dimensions of the components may change causing the space between the head of the fastener 205 and the upper surface of the component on which the lower housing portion 244 rests to increase. The spring 220 wedges itself into the channel 215 between the first and second disks 210, 212. This action causes the first disk 210 and upper housing portion 242 to be drive upward to maintain contact with the head of the fastener 205 and maintain the tension in the fastener so that the connection is tightly held. Moreover, the spring 220 now becomes part of the force path between the head of the fastener 205 and the upper surface of the component. In other words, force now travels through the spring 220 to get from the first disk 210 to the second disk 212. The anti-rotation features described previously herein maintain the spring 220 in a configuration that allow it to transfer to the force without failing under the load.

Figure 16:
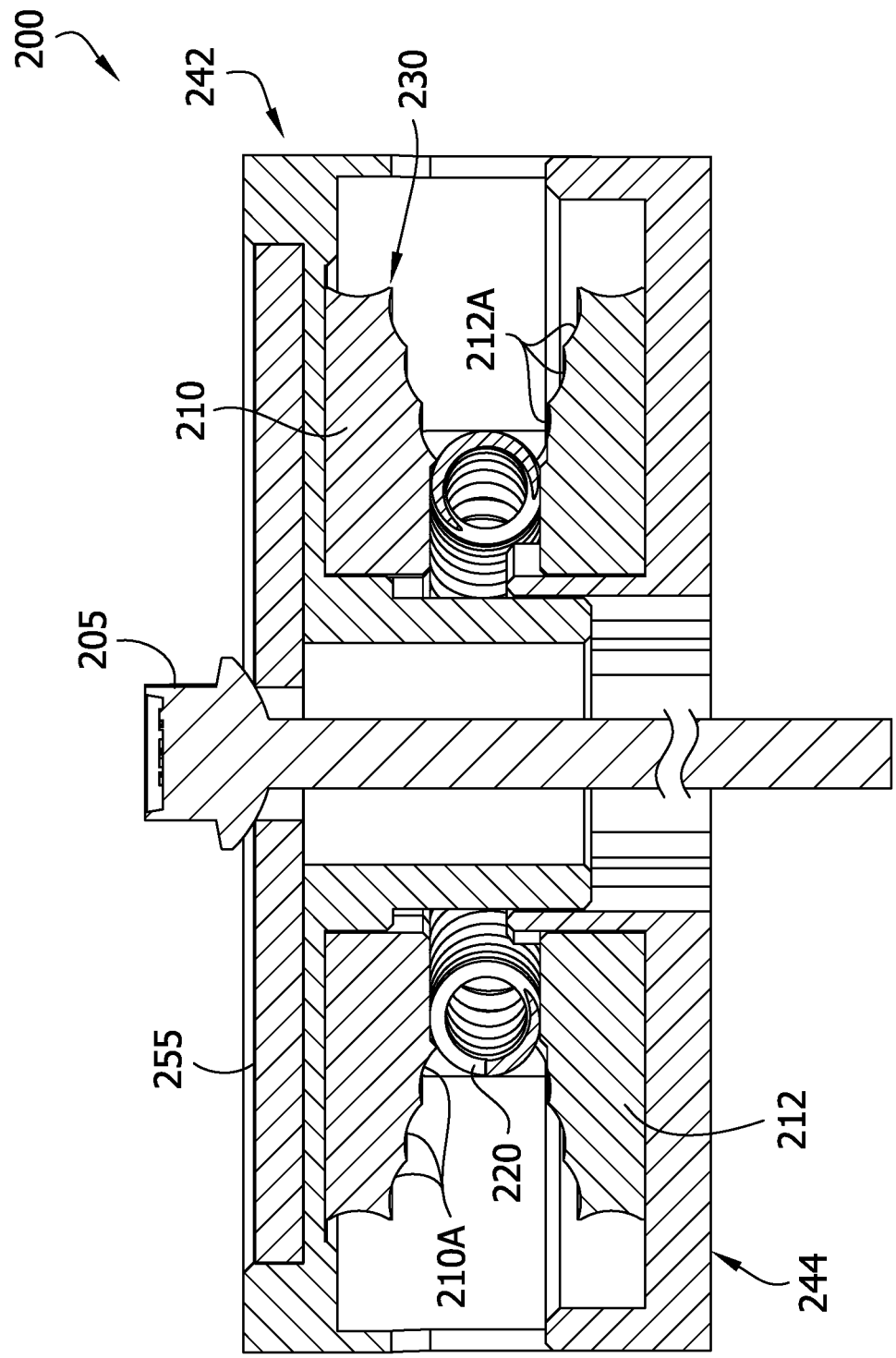
FIG. 16 is the vertical section of FIG. 15, but illustrating the activated expandable washer in the maximum expanded position.

To the extent that the space between the head of the fastener 205 and the upper surface of the component increases any more over time, the spring 220 will progressively work its way radially inward in the channel 215 and drive the first and second disks 210, 212 farther apart. As with the embodiment of FIGS. 1-8, the first and second disks 210, 212 have facing surfaces with concentric grooves 210A, 212A which temporarily capture the spring 220 as it moves radially inwardly. FIG. 16 shows a maximum expanded condition of the expandable washer 200. The expandable washer 200 is designed so that in the vast majority of cases over the expected service life structure, this position is not reached. Thus, the expandable washer 200 is able to maintain a tight connection of the components and resist upload forces for a long period of time under changing conditions.

Other configurations of an expandable washer 100, 200 can be used without departing from the scope of the present disclosure. In the illustrated embodiments, the first disks 110, 210, second disks 112, 212 and housings 140, 240 may be made of a robust polymeric material, such as a nylon material. However, other materials could be used. As various changes could be made in the above constructions and methods without departing from the scope of the invention, it is intended that all matter contained in the above description and shown in the accompanying drawings shall be interpreted as illustrative and not in a limiting sense.

What is claimed is:

1. An expandable washer for use with a fastener for connecting to a component to maintain tension in the fastener after connection to the component, the expandable washer comprising:
   a first expander member;
   a second expander member operatively connected to the first expander member for relative movement with respect to each other along an expansion axis parallel to or coincident with a fastener insertion axis, the first and second expander members being in generally opposed relation and cooperatively defining a channel having a dimension parallel to the expansion axis which decreases from a location remote from the expansion axis to a location closer to the expansion axis, the first and second expander members being configured to pass the fastener through the first and second expander members to the component so that the fastener operatively engages the first expander member for moving with the first expander member and the first expander member applies force to the fastener to place the fastener in tension when the fastener is connected to the component;
   a cam located radially outward from the expansion axis and biased for movement toward the expansion axis and between the first and second expander members to drive the first and second expander members apart to maintain the application of force to place the fastener in tension by the first expander member to the fastener when the fastener is received through the expandable washer and connected to the component;
   an anti-rotation element associated with the first and second expander members configured to prevent rotation of the first and second expander members relative to one another about the expansion axis, the anti-rotation element having opposite first and second ends spaced apart along the expansion axis, the anti-rotation element having a side between the first and second ends arranged to engage the first and second expander members to prevent rotation of the first and second expander members relative to one another about the expansion axis.

2. The expandable washer as set forth in claim 1, wherein the anti-rotation element is configured to permit relative movement of the first and second expander members along the expansion axis.

3. The expandable washer as set forth in claim 2 to wherein the first and second expander members are of identical construction.

4. The expandable washer as set forth in claim 2, further comprising a housing enclosing the first and second expander members and cam.

5. The expandable washer as set forth in claim 4, wherein the housing comprises an upper housing portion and a lower housing portion, the housing further including a shaft extending between the upper and lower housing portions, the first and second expander members being received on the shaft for movement with respect to the shaft along the expansion axis.

6. The expandable washer as set forth in claim 5, wherein the first and second expander members are connected to the shaft, and wherein the anti-rotation element comprises a spline of the shaft received in a slot of the first expander member and a slot of the second expander member to prevent relative rotation between the first and second expander members and the shaft.

7. The expandable washer as set forth in claim 5, wherein the upper housing portion and lower housing portion are configured to move along the expansion axis with respect to each other and held from rotation about the expansion axis with respect to the shaft.

8. The expandable washer as set forth in claim 1, further comprising a head support configured to engage a head of the fastener for transferring force between the head of the fastener and the head support.

9. The expandable washer as set forth in claim 1, further comprising locking structure having a locked position in which the cam is restrained by the locking structure from movement toward the expansion axis and an unlocked position in which the locking structure does not restrain movement of the cam toward the expansion axis, the locking structure being configured to move from the locked position to the unlocked position by the fastener when the fastener is being connected to the component through the expandable washer.

10. The expandable washer as set forth in claim 9, wherein the locking structure includes a cam retainer on at least one of the first and second expander members.

11. The expandable washer as set forth in claim 10, wherein the cam retainer comprises a recess formed into at least one of the first expander member and the second expander member.

12. The expandable washer as set forth in claim 11, wherein the cam comprises a spring having a generally circular shape and biased through a spring force of the spring to contract from a larger diameter to a smaller diameter, the spring being received by the recess in the locked position.

13. The expandable washer as set forth in claim 2, wherein the cam comprises a spring and wherein at least one of the first expander member and the second expander member is formed with concentric grooves, each concentric groove being configured to receive and releasably retain the spring in a radial position with respect to the expansion axis.

14. The expandable washer as set forth in claim 1, wherein the anti-rotation element comprises a spline received in a slot of the first expander member and a slot of the second expander member to prevent relative rotation between the first and second expander members.

15. An expandable washer for use with a fastener for connecting to a component to maintain tension in the fastener after connection to the component, the expandable washer comprising:
  a first expander member;
  a second expander member operatively connected to the first expander member for relative movement with respect to each other along an expansion axis parallel to or coincident with a fastener insertion axis, the first and second expander members being in generally opposed relation and cooperatively defining a channel having a dimension parallel to the expansion axis which decreases from a location remote from the expansion axis to a location closer to the expansion axis, the first and second expander members being configured to pass the fastener through the first and second expander members to the component so that the fastener operatively engages the first expander member for moving with the first expander member and the first expander member applies force to the fastener to place the fastener in tension when the fastener is connected to the component;
  a coil spring located radially outward from the expansion axis and biased for movement toward the expansion axis in the channel between the first and second expander members to drive the first and second expander members apart to maintain the application of force to place the fastener in tension by the first expander member to the fastener when the fastener is received through the expandable washer, the coil spring extending lengthwise around the expansion axis along a helical axis, the helical axis being a circle passing through a center of the coil spring, and encircling the expansion axis, a spring force of the coil spring urging the coil spring to reduce a diameter of the helical axis, the coil spring being configured to transfer force between the first expander member to the second member in a direction perpendicular to the lengthwise extent of the coil spring having a spring body which wraps helically around the helical axis by rotating around the helical axis as the spring body translates lengthwise along the helical axis.

16. The expandable washer as set forth in claim 15, wherein the coil spring engages the first and second expander members in the channel.

17. The expandable washer as set forth in claim 16, wherein the first expander member or the second expander member is formed with a first plurality of concentric grooves, each concentric groove of the first plurality of concentric grooves being configured to receive and releasably retain the coil spring in a radial position with respect to the expansion axis.

18. The expandable washer as set forth in claim 17, wherein the first expander member is formed with the first plurality of concentric grooves, the second expander member being formed with a second plurality of concentric grooves, each concentric groove of the second plurality of concentric grooves being configured to receive and releasably retain the coil spring in a radial position with respect to the expansion axis.

19. The expandable washer as set forth in claim 15, wherein the first and second expander members are operatively connected to each other thereby to hold the first and second expander members against relative rotation.

20. The expandable washer as set forth in claim 15, wherein the coil spring is movable relative to the first and second expander members between a first position in which the application of force to place the fastener in tension is transferred directly between the first expander member and the second expander member, and a second position in which the application of force to place the fastener in tension is transferred by way of the coil spring between the first expander member and the second expander member.

21. The expandable washer as set forth in claim 15, wherein the spring body comprises a wire formative.

22. The expandable washer as set forth in claim 15, wherein the spring body is continuously wrapped helically around the helical axis such that the spring body is endless.

23. The expandable washer as set forth in claim 15, wherein the spring body forms a plurality of coils, each coil being slanted with respect to the expansion axis.

24. The expandable washer as set forth in claim 15, wherein the spring body forms a plurality of coils, each coil having a diameter, the diameters of the coils being substantially identical.

25. An expandable washer for use with a fastener for connecting to a component to maintain tension in the fastener after connection to the component, the expandable washer comprising:

a first expander member;
a second expander member operatively connected to the first expander member for relative movement with respect to each other along an expansion axis parallel to or coincident with a fastener insertion axis, the first and second expander members being in generally opposed relation and cooperatively defining a channel having a dimension parallel to the expansion axis which decreases from a location remote from the expansion axis to a location closer to the expansion axis, the first and second expander members being configured to pass the fastener through the first and second expander members to the component so that the fastener operatively engages the first expander member for moving with the first expander member and the first expander member applies force to the fastener to place the fastener in tension when the fastener is connected to the component;
a cam located radially outward from the expansion axis and biased for movement toward the expansion axis and between the first and second expander members to drive the first and second expander members apart to maintain the application of force to place the fastener in tension by the first expander member to the fastener when the fastener is received through the expandable washer and connected to the component;
a housing receiving and containing the first expander member, the second expander member and the cam, the housing including a first housing portion and a second housing portion, the first and second expander members being disposed axially between the first and second housing portions along the expansion axis, the first and second housing portions and the first and second expander members being arranged such that an axis, parallel to the expansion axis and spaced radially inward from a radially outer-most edge of the first expander member, intersects in order the first housing portion, the first expander member, the second expander member, and then the second housing portion.

26. The expandable washer as set forth in claim 25, wherein the housing comprises an upper housing portion and a lower housing portion, the housing further including a shaft extending between the upper and lower housing portions, the first and second expander members being received on the shaft for movement with respect to the shaft along the expansion axis, the shaft being operatively engaged with the first and second expander members to prevent relative rotation of the first and second expander members.

27. The expandable washer as set forth in claim 25, wherein the first and second housing portions are moveable relative to one another along the expansion axis.

28. The expandable washer as set forth in claim 25, wherein the housing encloses the first and second expander members and the cam.

29. An expandable washer for use with a fastener for connecting to a component to maintain tension in the fastener after connection to the component, the expandable washer comprising:
a first expander member;
a second expander member operatively connected to the first expander member for relative movement with respect to each other along an expansion axis parallel to or coincident with a fastener insertion axis, the first and second expander members being in generally opposed relation and cooperatively defining a channel having a dimension parallel to the expansion axis which decreases from a location remote from the expansion axis to a location closer to the expansion axis, the first and second expander members being configured to pass the fastener through the first and second expander members to the component so that the fastener operatively engages the first expander member for moving with the first expander member, and the first expander member applies force to the fastener to place the fastener in tension when the fastener is connected to the component;
a cam located radially outward from the expansion axis, the cam being biased for movement radially inward toward the expansion axis in the channel between the first and second expander members to urge the first and second expander members apart to maintain the application of force for placing the fastener in tension by the first expander member to the fastener when the fastener is received through the expandable washer and connected to the component, wherein the first expander member or the second expander member includes a first groove and a second groove spaced radially inwardly with respect to the expansion axis from the first groove, the first groove being configured to receive and releasably retain the cam in a first radial position with respect to the expansion axis, the second groove being configured to receive and retain the cam in a second radial position with respect to the expansion axis, the second radial position being radially inward of the first radial position, wherein the cam is configured to move radially inwardly from the first radial position associated with the first groove toward the second radial position associated with the second groove as the cam moves toward the expansion axis to urge the first and second expander members apart.

30. The expandable washer as set forth in claim 29, wherein the first expander member includes the first groove and the second groove, the second expander member including a third groove and a fourth groove spaced radially inwardly with respect to the expansion axis from the third groove, the third groove being configured to receive and releasably retain the cam in the first radial position and the fourth groove being configured to receive and retain the cam in the second radial position.

31. The expandable washer as set forth in claim 30, wherein the first and second expander members are operatively connected to each other thereby to hold the first and second expander members against relative rotation.

32. The expandable washer as set forth in claim 29, further comprising locking structure having a locked position in which the cam is restrained by the locking structure from movement toward the expansion axis and an unlocked position in which the locking structure does not restrain movement of the cam toward the expansion axis, the locking structure being configured to move from the locked position to the unlocked position by the fastener when the fastener is being connected to the component through the expandable washer.

33. The expandable washer as set forth in claim 32, wherein the locking structure includes a cam retainer on one of the first expander member or second expander member.

34. The expandable washer as set forth in claim 33, wherein the cam retainer comprises a recess formed into at least one of the first expander member and the second expander member.

35. The expandable washer as set forth in claim 34, wherein the cam comprises a spring having a generally circular shape and biased through a spring force of the spring to contract from a larger diameter to a smaller diameter, the spring being received by the recess in the locked position.

* * * * *